Nov. 29, 1938.  G. HEYMER  2,138,097
COPYING LENTICULAR PHOTOGRAPHIC FILMS
Filed Dec. 6, 1935
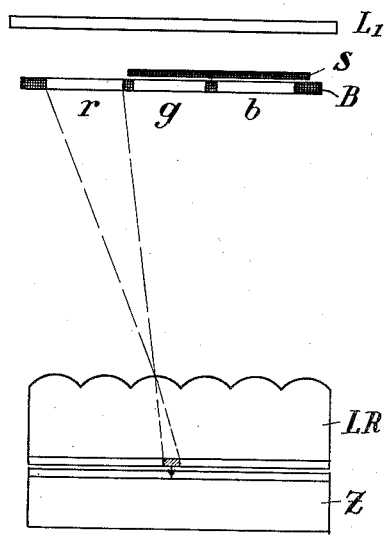
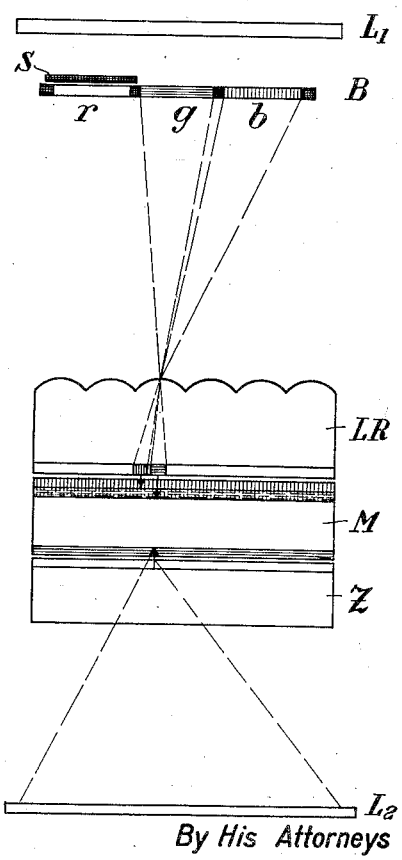
Inventor
Gerd Heymer
By His Attorneys Patented Nov. 29, 1938

2,138,097

UNITED STATES PATENT OFFICE 2,138,097

COPYING LENTICULAR PHOTOGRAPHIC FILMS

Gerd Heymer, Wolfen, Kreis Bitterfeld, Germany, assignor to I. G. Farbenindustrie Aktiengesellschaft, Frankfort-on-the-Main, Germany Application December 6, 1935, Serial No. 53,164
In Germany December 8, 1934

2 Claims. (Cl. 95—2)

This invention relates to a process of copying an original lenticular film on smooth film.

One of its objects is a process of printing a lenticular film on smooth film which is simple and efficient. Further objects will be seen from the detailed specification following hereafter.

It has been proposed to produce component pictures from lenticular photographic films on non-lenticular photographic material by illuminating, through the lenticular surface, with or without a color filter, the lenticular negative film with the aid of an objective having the same function as that of the optical system used for exposure particularly in respect of the position of the plane of the color filter. In this manner partial color pictures are obtained when there is placed in the plane of the color filter, or directly in front of the color filter of the illuminating objective, a screen which covers the surface of the whole of the filter strips except one.

By reason of the necessary numerous copying operations it is difficult in this method to attain a sufficiently exact registering of the partial pictures. The number of the copying operations is relatively large especially when the copy is made on a so-called silver bleaching-out film in which the colors of the finished partial pictures are already present in the layers, and in which the color is bleached at those places where silver is produced. According to this method there is obtained a positive from a positive. Since on the other hand, in the case of lenticular films, it is generally necessary to use reversal development for improving the resolving power in using silver bleaching-out layers the copying process must proceed normally so that first, after the exposure of the lenticular film which is a reversal positive, three negatives are made as components from which positives are copied and these again copied in succession on the colored layers of the silver bleaching-out film. In three-color pictures, therefore, a nine-fold copying process is required. Even when a copying machine is used which yields for the normal three fold copying a direct and sufficient registering of the partial pictures the ever-present errors result in a lack of sharpness in the picture which increases with the copying operations.

The present invention relates to a process which avoids these disadvantages and whereby the copying operations can be reduced to two. For this purpose three colored silver halide emulsion layers are distributed on the two faces of the support and this material is used for taking a copy, the picture being produced by the silver bleaching-out process in the manner described in my co-pending application Ser. No. 646,703, filed Dec. 10, 1932, the lenticular film is first copied to produce one partial color picture which is developed to a positive by reversal; this positive, simultaneously with the two other partial color pictures, is copied, the one color component on the single layer and the other two components, still contained in the lenticular original, on the two layers which are superimposed, the lenticular film being arranged in contact with the superimposed layers and illuminated through screen apertures having color filters arranged for the components in the manner described in U. S. Patent 1,874,529 and British Patent 440,187; the color of these filter surfaces, without respect to the color of the partial color pictures to be copied, is adjusted to the sensitiveness of the superimposed layers.

Since the invention involves only two copying processes fewer operations are necessary than in the production of normal three-color pictures.

The copying material may be, for example, a film having a purple and a yellow layer on the one face and a blue-green layer on the other. The blue-green layer may be colored by Congo Pure Blue (Schultz Farbstofftabellen 1931, vol. 1 A 513) or Brilliant Benzo-Fast-Green (obtainable by diazotizing the azo-dyestuff from diazotized 2-naphthylamino-8-sulfonic acid and 1-amino-2-naphtholethyl ether with sodium nitrite and hydrochloric acid, isolating the intermediate product formed and adding it in admixture with water to a solution of 1-acetylamino-8-naphthol-3:6-disulfonic acid which has been made alkaline by addition of sodium bicarbonate and to which pyridine has been added), and is not specially sensitized. The purple layer is arranged next the support and is colored by Sirius-Red-Violet R (Schultz Farbstofftabellen, 7th edition, vol. 2, page 198, lines 19 to 23) or Sirius-Ruby B (Schultz Farbstofftabellen 7th edition, vol 2, page 198, lines 24 to 26) and is sensitized to red, for instance, by means of pinacyanol. The yellow layer is colored by Sirius Yellow R (Schultz Farbstofftabellen 1931, page 197, lines 11 to 6 from below) or Chrysophenin G or W (Schultz Farbstofftabellen 1923, 6th edition No. 304) and is sensitized to green, for instance, by means of uinaflavol. On this material the blue and green components are produced on the superimposed layers and the red on the single layer.

The red component is first copied from the lenticular film on a copying material suited for reversal development and in this operation the original lenticular film is illuminated through the lenticular screen with or without a color filter with the aid of an objective having a function the same as that of the optical system used in the exposure particularly in respect of the position of the plane of the color filter relatively to the lenticular film in such a manner that the negative film presents, when viewed from the layer side, a picture of the object photographed in the corresponding lights and shades, and in the plane of the color filter, or directly before the color filter, of the illuminating objective there is arranged a screen which covers the surface of the whole of the color strips save one. Instead of the illuminating objective and a matt plate there may be arranged luminous slots, the extension of which in a direction perpendicularly to the lenticular elements is equal to, or smaller than, the corresponding filter strips of the filter used in the exposure of the lenticular film or the virtual image of such filter, these slots being placed at a distance from the lenticular film equal to the distance of the exposure filter or its virtual image. By reversal development of this red component there is obtained a red positive.

The red positive thus obtained is now copied, simultaneously with the lenticular film, in a contact copying machine on a silver bleaching-out film in which two sensitive layers are carried on one face and one sensitive layer on the other face; the red positive is copied on the blue-green single layer, and the blue and green components on the layers that are superimposed on each other. The lenticular film and the copying material are placed together, with their layer faces in contact, and similarly, the red positive is placed against the other side of the copying material, layer to layer. The reversal positive is illuminated in the usual manner. The copying of the green and blue component is carried out in the manner indicated above for obtaining component pictures by the lenticular screen process, the slots in the diaphragm which correspond to the two partial color pictures being covered by a filter, the transparency of which is adjusted by the method described in my co-pending application Ser. No. 646,703, filed Dec. 10, 1932, to the sensitivity of the two silver bleaching-out layers of the copying material so that the rays passing through the green filter diaphragm enter the purple layer, whereas the rays passing through the blue filter diaphragm enter the yellow layer. The expressions "green filter diaphragm" and "blue filter diaphragm" denote the diaphragms at which the filters of the corresponding colors were situated during the exposure without respect to the color of the filter which is to be at this position in the copying process. If, for example, the purple colored layer is only blue-sensitive, whereas the yellow layer, which underlies it, is red-sensitive, then in the green filter diaphragm there is placed a filter which is transparent to blue light while absorbing the red light and in the blue filter diaphragm there is placed a filter which transmits red but absorbs blue. In this manner it is possible, in one copying process, to copy simultaneously on the one side the blue and green partial picture and on the other side the red partial picture.

The invention is further illustrated by the accompanying drawing, Figure 1 of which diagrammatically illustrates a method for copying a color component image of the lenticular film onto an intermediate film by contact printing, and Figure 2 of which shows diagrammatically the copying onto a multi-layer film.

On the drawing, reference character B represents a diaphragm having apertures $r, g, b$ corresponding with the three filters used in the exposure. The lenticular film LR is positioned between the diaphragm B and an intermediate film Z. S is a sliding plate adapted to close apertures in the diaphragm B. $L_1$ represents a luminous area. In Figure 2 a multi-layer film M is interpolated between the lenticular film LR and the film C. It will be noted that in this figure a further luminous area $L_2$ is provided.

The method of operation of the set-up of Figure 1 is deemed self-explanatory, it being deemed sufficient to refer to the fact that the color component in this figure is a red component and that the apertures $g$ and $b$ in the diaphragm B are covered by the sliding plate S. In Figure 2 the green image and the blue image of the lenticular film are copied from one side of the multi-layer film and the red image of the intermediate film from the other side of the three layer film into the blue green layer. The green image is printed by blue light into the uppermost purple layer which is not especially sensitized, the blue image being printed by red light into the yellow layer sensitized to red. The multi-layer film is then worked up according to the silver dyestuff bleaching-out process.

The invention is not limited to the use of the copying material described above but extends to any choice of distribution of the component pictures with corresponding sensitization of the layers.

What I claim is:

1. In a process of copying a lenticular film bearing in its emulsion layer partial color pictures onto a smooth copy film provided with two light-sensitive layers in superposition on one side of the support and with one light-sensitive layer on the opposite side of the support the improvement which comprises copying by any known optical or contact printing process one partial color picture of the lenticular film onto an intermediate film by means of a diaphragm being transparent only to the rays between the picture aperture and that plane in which the corresponding partial color filter was situated during the exposure, and printing simultaneously the remaining partial color pictures of the lenticular film onto the double coated side of said copy film by any known optical or contact printing process, the openings corresponding to the planes of the filters being provided with a filter of such color that each of the layers sensitized to different spectral regions receives a partial picture of its specific color, while printing the intermediate film onto the other side with light corresponding to the sensitiveness of said side, and subsequently transforming the layers into color pictures in a known manner.

2. In a process of copying a lenticular film bearing in its emulsion layer partial color pictures onto a smooth copy film provided with two light-sensitive layers in superposition on one side of the support and with one light-sensitive layer on the opposite side of the support the improvement which comprises copying by any known optical or contact printing process one partial color picture of the lenticular film onto an intermediate film to form an original from said partial color picture by means of a diaphragm being transparent only to the rays between the picture aperture and that plane in which the corresponding partial color filter was situated during the exposure, and printing simultaneously the remaining partial color pictures of the lenticular film onto the double coated side of said copy film by any known optical or contact printing process, the openings corresponding to the planes of the filters being provided with a filter of such color that each of the layers sensitized to different spectral regions receives a partial picture of its specific color, while printing the intermediate film onto the other side with light corresponding to the sensitiveness of said side, and subsequently transforming the layers into color pictures in a known manner.

GERD HEYMER.